United States Patent [19]

Fishburn et al.

[11] 4,015,979

[45] Apr. 5, 1977

[54] BONDING OF PARTICULATE MATERIALS

[75] Inventors: Robert Anthony Fishburn; Frank Ernest George Ravault, both of Birmingham, England

[73] Assignee: Foseco International Limited, Birmingham, England

[22] Filed: Oct. 31, 1975

[21] Appl. No.: 627,784

Related U.S. Application Data

[63] Continuation of Ser. No. 419,882, Nov. 28, 1973, abandoned.

[30] Foreign Application Priority Data

Dec. 11, 1972 United Kingdom ............ 57048/72
Dec. 11, 1972 United Kingdom ............ 57049/72

[52] U.S. Cl. .................................. 75/25; 264/117
[51] Int. Cl.$^2$ ........................................ B01J 2/00
[58] Field of Search ................ 264/117; 75/25

[56] References Cited

UNITED STATES PATENTS 3,894,882  7/1975  Takewell ............................ 264/117
3,961,032  6/1976  Vermeulen .......................... 75/25

*Primary Examiner*—Robert F. White
*Assistant Examiner*—James R. Hall
*Attorney, Agent, or Firm*—Cushman, Darby & Cushman

[57] ABSTRACT

A method of bonding particulate material, especially such material which contains iron or zinc oxides, e.g. steelmaking fume or blast furnace dust, by treating the material with at least aqueous formic acid to produce an acid solution containing metal ions, and then allowing or causing the pH of the solution to increase so as to form a metal hydroxide to bond the material to consolidated form.

5 Claims, No Drawings

BONDING OF PARTICULATE MATERIALS

This is a continuation of application Ser. No. 419,882 filed Nov. 28, 1973 now abandoned.

This invention relates to the bonding of particulate materials, particularly metal-oxide-containing materials.

There are many areas of technology in which it is desired to consolidate particulate material to form a solid mass. Examples are the building of roads, the preparation of foundations for buildings, cementitious materials and making particulate materials more handleable.

A wide variety of methods are known for effecting such consolidation but many are cumbersome or expensive to effect. The present invention provides a novel process of consolidation which is of particular value for application to particulate materials which already contain suitable sources of metal ions.

The invention is of particular value in bonding metal oxide-containing materials. In various metal extractive and refining processes finely divided metal oxide is generated either as the desired intermediate product or as waste material. When the metal oxide is a waste material it may be desirable to recycle such material to a primary metal reduction stage in order to recover metal and improve the overall economy of the process.

One area of particular importance is iron and steel manufacture: various stages give rise to fume and/or dust of iron oxide in various oxidation states, for example blast furnace dust and fume from basic oxygen steelmaking. It is not possible to use these fine iron oxide wastes by recycling on to a sinter strand since they lower the permeability of the sinter bed, and are lost by removal through extraction hoods during the sintering process.

Similar problems arise with zinc oxide fines, which is recycled as such to conventional zinc ore sinter beds, tend to reduce the sinter bed permeability.

There is therefore a need in the metallurgical industry of a process for bonding and agglomerating fine materials to form a product of sufficient strength for use in the blast furnace in direct reduction processes, as a coolant and source of iron in a basic oxygen converter or for recycling to a sinter strand. One method which has been proposed is to agglomerate the fine material by pelletisation or briquetting, and then fire the agglomerated material at high temperatures in order to provide a product of adequate strength. Several cold bonding methods have also been proposed for the treatment of fine ores, including cement bonding, sodium silicate bonding, and the formation of a calcium carbonate bond from lime by gassing with carbon dioxide. These methods suffer from disadvantages. Both cement bonding and sodium silicate bonding increase the silica level in the blast furnace while gassing with carbon dioxide requires high gas pressures to be effective, and thus involves considerable capital expenditure on equipment.

According generally to the present invention there is provided a method of bonding particulate material which comprises treating the material with at least aqueous formic acid to produce an acid solution containing metal ions and allowing or causing the pH of the solution to increase so as to form a metal hydroxide to bond the material to consolidated form.

The pH of the solution may increase as a result of removal of hydrogen ions from the solution by further reaction with the source of metal ions, e.g. a metal, metal oxide or metal sulphide, or the pH may increase due to the dissolution of a basic substance contained in the particulate material being consolidated. Alternatively, the pH of the solution may be increased by the deliberate addition to the solution of a basic substance.

In many cases, the material to be consolidated will itself contain an adequate source of metal ions to produce a bond by the process of the invention. In other cases a source of metal ions may have to be added. The metal ions may be provided from a suspension of an insoluble metal compound, e.g. a suspension of a metal, metal sulphide, metal oxide or metal carbonate in water, the metal ions being released by the subsequent addition of the formic acid. Alternatively, the metal ions may be provided from an aqueous solution of formic acid and a water soluble metal salt.

The time required to bond the particulate material and the strength of the bond produced by the method according to the invention are dependent on factors such as solubility of the source of metal ions, specific surface area of the source of metal ions, concentration of any basic substance present, and strength and concentration of the formic acid.

As noted above, the method is of particular value in bonding metal oxide-containing materials. Thus, according to a particular feature of the present invention there is provided a method of bonding iron oxide or zinc oxide-containing material which comprises treating particulate iron oxide or zinc oxide-containing material with formic acid to produce a solution containing $Fe^{++}$, $Fe^{+++}$ or $Zn^{++}$ ions, allowing or causing the pH of the solution to increase so as to form iron or zinc hydroxide and forming the treated material to agglomerated particulate form.

The pH of the solution may increase as a result of removal of hydrogen ions from the solution by further reaction with iron oxide or zinc oxide, or by reaction with metallic iron which may be present, or the pH may increase due to the dissolution of a basic substance contained in the iron oxide or zinc oxide-containing material being treated. Alternatively, the pH of the solution may be increased by the deliberate addition to the solution of a basic substance.

As noted above, the time required to form a bond and the final strength of the bonded oxide product so made are dependent on factors such as the solubility of the iron or zinc oxide-containing material, specific surface area of the iron or zinc oxide being treated, concentration of basic substance and on the strength and concentration of the formic acid used for the treatment.

The process is principally of value in bonding iron oxide-containing materials in which the iron oxide is in a low state of oxidation, e.g. wustite (FeO). Such materials arise as fume from basic oxygen steelmaking processes which are operated by known extractor systems. Materials such as blast furnace dust, which contain higher oxides of iron, e.g. $Fe_2O_3$ and $Fe_3O_4$ react more slowly with formic acid.

The exact process used may vary widely as to details and as to the relative proportions of the materials used. Typically about 5–20% by weight of a 10% by volume aqueous solution of formic acid is added to the raw iron oxide. Immediately after mixing the pH drops rapidly with subsequent formation of dissolved $Fe^{++}$ or $Fe^{+++}$ ions. The pH of the solution then rises rapidly towards neutrality so that when the solubility product of iron hydroxide is exceeded formation of iron hydroxide commences. Soon after the addition of the acid the mixture is usually agglomerated, for example, by briquetting. Alternatively dilute acid may be sprayed on to the material on a pelletising disc as a means of simultaneously agglomerating and chemically bonding the material. The acid also be mixed with the material and agglomerates produced by extrusion.

The strength of the bond continues to increase after the agglomeration process and both the strength and the abrasion resistance of the final product are adequate for the product to be used as a blast furnace burden.

In some cases it may be desirable to add other materials to the iron oxide or zinc oxide-containing material being treated.

For example, in the treatment of basic oxygen converter wastes other oxides such as millscale may be incorporated in order to give increased strength. Other materials such as lime, coke fines, or blast furnace dust may be added to improve the metallurgical properties of the final product.

The following examples will serve to illustrate the invention.

EXAMPLE 1

Dried filter cake arising from a basic oxygen converter and having the following chemical composition by weight:

| Fe metal | 22.5% |
|---|---|
| FeO | 55.5% |
| $Fe_3O_4$ | 3.5% |
| $Fe_2O_3$ | 3.0% |
| $CaCO_3$ | 8.1% |
| $SiO_2$ | 1.7% |
| $Al_2O_3$ | 0.23% |
| MnO | 1.37% |
| ZnO | 1.48% |
| C | 1.30% |
| S | 0.11% |
| $P_2O_5$ | 0.35% |
| | 99.14% | was sprayed while rotating in a revolving drum with 10% by weight of a 10% volume aqueous solution of formic acid. Mixing was continued for 5 minutes.

The resultant material was then tabletted at 7,130 p.s.i. to give tablets 18 mm diameter by 18 mm high.

A control mixture was treated in exactly the same way, except that 10% by weight of water was used, instead of the formic acid solution.

The crushing strengths of the tablets were measured 48 hours after forming and the following results obtained (average of 5 determinations).

| A. Tablets treated with formic acid: | |
|---|---|
| Crushing strength: | 0.89 tons/in$^2$ |
| B. Tablets treated with water: | |
| Crushing strength: | 0.45 tons/in$^2$ |

EXAMPLE II

The dried fume as used in Example 1 was mixed with 10, 20 and 40% of millscale. Each mixture was separately treated in a revolving drum by spraying with 10% by weight of a 10% by volume aqueous solution of formic acid. Mixing was continued for 5 minutes.

The resultant materials were tabletted immediately, using a forming pressure of 12,000 p.s.i. to give tablets 18 mm diameter by 18 mm high.

The crushing strengths of the tablets were measured 48 hours after forming and the following results obtained (average of 5 determinations on each mixture).

| A. Tablets produced from 90% fume, 10% millscale: | |
|---|---|
| Crushing strength: | 0.74 tons/in$^2$ |
| B. Tablets produced from 80% fume, 20% millscale: | |
| Crushing strength: | 1.40 tons/in$^2$ |
| C. Tablets produced from 60% fume, 40% millscale: | |
| Crushing strength: | 0.80 tons/in$^2$ |

EXAMPLE III

The dried fume, as used in Examples I and II, was mixed with millscale and slaked lime in the following proportions:

| Dried converter fume | 40% w/w |
|---|---|
| Millscale | 10% w/w |
| Slaked lime | 50% w/w |

The mixture was treated in a revolving drum by spraying with 10% by weight of a 10% by volume aqueous solution of formic acid. Mixing was continued for 5 minutes.

The resultant mixture was tabletted immediately, using a forming pressure of 12,000 p.s.i. to give tablets 18mm diameter by 18mm high.

The crushing strengths of the tablets were measured after various time intervals in order to demonstrate the development of strength with time. The following results were obtained (average of 5 determinations at each time interval).

| A. Tablets after 15 minutes | |
|---|---|
| Crushing strength: | 0.34 tons/in$^2$ |
| B. Tablets after 5 hours | |
| Crushing strength: | 0.44 tons/in$^2$ |
| C. Tablets after 24 hours | |
| Crushing strength: | 0.75 tons/in$^2$ |
| D. Tablets after 48 hours | |
| Crushing strength: | 0.85 tons/in$^2$ |

EXAMPLE IV

Pure zinc oxide was treated in a revolving drum by spraying with 10% by weight of a 10% by volume aqueous solution of formic acid. Mixing was continued for 5 minutes.

The resultant material was then tabletted at a pressure of 7,130 p.s.i. to give tablets 18mm diameter and 18mm high.

A control mixture was treated in exactly the same way, except that 10% by weight of water was used in place of the formic acid solution.

The crushing strengths of the tablets were measured 48 hours after forming. The following results were obtained (average of 5 determinations).

| | |
|---|---|
| A. Tablets treated with formic acid | |
| Crushing strength: | 1.22 tons/in² |
| B. Tablets treated with water | |
| Crushing strength: | 0.56 tons/in² |

These examples are all directed to the treatment of finely divided iron or zinc oxide. The method of the present invention may be used in analogous processes such as in the following areas:

1. In the building and construction industry, in consolidation of soils in such operations as tunnelling, trenching, shaft sinking, road building and the preparation of foundations for buildings. In these applications the soils themselves will often contain suitable sources of metal ions so that it may be sufficient to inject the soils with formic acid.

2. The bonding of foundry sands. Sand, usually silica, containing a source of metal ions may be mixed with formic acid to produce, during subsequent utilisation, a hardened sand mould or core for use in metal casting.

3. General use as a cement. A source of metal ions, formic acid, and a filler material may be mixed and used as a cement or mortar in such applications as the preparations of flooring materials.

4. Use as a briquetting or pelletising binder. In a wide variety of briquetting or pelletising applications conventional binders may be replaced with a metal ion/formic acid system according to the invention. This invention is of particular value in the bonding of ores and fines in the metallurgical industry since the need for firing agglomerated particulate material in order to obtain adequate strength is obviated, and disadvantages associated with known cold bonding processes are overcome.

5. Consolidation of the surface of stock piles of particulate material. Stock piles of ore and similar materials may be consolidated by spraying their surface with formic acid, thus eliminating pollution of the environment and giving an economic advantage due to the elimination of wind losses.

6. Manufacture of heat storage blocks. Iron oxide, the most commonly used material for heat storage blocks, can be conveniently consolidated using formic acid by the method of the invention.

We claim as our invention:

1. A method of bonding particulate material containing a source of metal ions which material is capable of reacting with an aqueous solution of formic acid to give ions of said metal, consisting essentially of:
   a. treating said particulate material with said formic acid solution to form an acid solution containing ions of said metal together with unreacted or undissolved particulate material,
   b. increasing the pH of said solution to convert said metal ions to a precipitated metal hydroxide, and
   c. bonding said unreacted or undissolved particulate material with said hydroxide as a binder formed by steps (a) and (b).

2. The method of claim 1 wherein said formic acid solution is sprayed upon said particulate material while said material is being agitated.

3. The method of claim 1 wherein 5-20% by weight of a 10% by volume aqueous solution of formic acid is added to said particulate material, said weight being based on the weight of particulate material.

4. The method of claim 1 wherein the particulate material contains at least one metal selected from the group consisting of iron and zinc in oxide form.

5. The method of claim 1 wherein said particulate material is blast furnace dust.

* * * * *